United States Patent
Sentoku et al.

(10) Patent No.: US 7,270,016 B2
(45) Date of Patent: Sep. 18, 2007

(54) SENSOR-EQUIPPED ROLLING BEARING UNIT

(75) Inventors: Minoru Sentoku, Kashiba (JP); Shirou Nakano, Minamikawachi-gun (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 11/311,135

(22) Filed: Dec. 20, 2005

(65) Prior Publication Data

US 2006/0137471 A1    Jun. 29, 2006

(30) Foreign Application Priority Data

Dec. 24, 2004 (JP) ............................. 2004-372605
Dec. 24, 2004 (JP) ............................. 2004-372607

(51) Int. Cl.
    *G01L 3/14*    (2006.01)
(52) U.S. Cl. ................................. 73/862.322
(58) Field of Classification Search ............ 73/862.322
    See application file for complete search history.

(56) References Cited

U.S. PATENT DOCUMENTS

| | | | |
|---|---|---|---|
| 5,309,094 A * | 5/1994 | Rigaux et al. .............. 324/174 |
| 5,381,090 A * | 1/1995 | Adler et al. ................. 324/174 |
| 6,161,962 A * | 12/2000 | French et al. ............... 384/459 |
| 6,535,135 B1* | 3/2003 | French et al. ............... 340/682 |
| 7,182,519 B2* | 2/2007 | Singh et al. ................. 384/448 |
| 2002/0118901 A1* | 8/2002 | Takamizawa et al. ....... 384/517 |

FOREIGN PATENT DOCUMENTS

| JP | 2003-232378 | 8/2003 |
|---|---|---|
| JP | 2004-205388 | 7/2004 |

* cited by examiner

*Primary Examiner*—Michael Cygan
*Assistant Examiner*—Octavia Davis
(74) *Attorney, Agent, or Firm*—Oblon, Spivak, McClelland, Maier & Neustadt, P.C.

(57) ABSTRACT

A sensor includes a stator having four or more magnetic pole teeth and concentric with a stationary-side raceway member, and excitation coils and detection coils wound around the respective magnetic pole teeth. Signals generated in the detection coils according to distances between the magnetic pole teeth and a rotation-side raceway member are taken out for the respective magnetic pole teeth. The load acting on a rolling bearing is obtained in processing means from these signals.

4 Claims, 5 Drawing Sheets

(a)

Displacement (b)

SENSOR-EQUIPPED ROLLING BEARING UNIT

BACKGROUND OF THE INVENTION

The present invention relates to a sensor-equipped rolling bearing unit in which a rolling bearing and a sensor device for detecting various pieces of information about the rolling bearing are integrated.

FIELD OF THE INVENTION

In an automobile, various pieces of information are required to control the automobile and therefore it is proposed to provide a sensor device to a hub unit (a rolling bearing unit for the wheel) having a stationary-side raceway member to be fixed to a vehicle body, a rotation-side raceway member to which a wheel is mounted, and two rows of rolling elements arranged between both the members. A conventional sensor device is mainly one for obtaining a rotary speed of an axle necessary for an ABS. In order to control a vehicle more accurately, detection of a tire ground load is now a new object. For detection of the load, detection by using a sensor having a good balance of accuracy and cost is desired.

JP-A 2003-232378 discloses disposition of an AE sensor in a vicinity of rolling elements as a sensor of a sensor-equipped rolling bearing unit.

Thus, use of the AE sensor as a sensor for detecting the load can be considered. If the AE sensor is disposed in the vicinity of the rolling elements as in the conventional art, however, raceway surfaces are polished and grease is filled; therefore, sounds coming out of the rolling elements are small and a sufficient output to detect the load cannot be obtained.

Also, JP-A 2004-205388 proposes use of a resolver as a sensor of the sensor-equipped rolling bearing unit.

The resolver in the sensor-equipped rolling bearing unit in JP-A 2004-205388 includes a stator having a plurality of magnetic pole teeth and coaxial with a stationary-side raceway member, and excitation coils and detection coils wound around the respective magnetic pole teeth. The coils wound around the respective magnetic pole teeth are connected to each other through a crossover and signals from the detection coils wound around the respective magnetic pole teeth are averaged to thereby sense a rotation angle. Therefore, in obtaining change of the load acting on the hub unit by using this resolver, an output value is deadened due to the averaging.

SUMMARY OF THE INVENTION

It is an object of the present invention to provide a sensor-equipped rolling bearing unit in which a tire ground load can be detected and a sensor having a good balance of accuracy and cost can be used in detecting the load.

It is another object of the present invention to provide a sensor-equipped rolling bearing unit in which a load can be detected by using an AE sensor as a sensor.

It is still another object of the present invention to provide a sensor-equipped rolling bearing unit in which load detecting accuracy can be enhanced as compared with a case in which a known resolver is used as a sensor.

According to a first aspect of the present invention, there is provided a sensor-equipped rolling bearing unit comprising: a rolling bearing which includes a stationary-side raceway member, a rotation-side raceway member, and rolling elements; and a sensor device which includes a sensor provided to the stationary-side raceway member, and processing means for obtaining a load acting on the rolling bearing from an output of the sensor, wherein the sensor is an AE sensor and disposed in a vicinity of a seal device provided between the stationary-side raceway member and a rotation-side raceway member, and the load acting on the rolling bearing is obtained in the processing means from a sliding sound of the seal device detected by the AE sensor.

The seal device may be formed of a seal member provided to the stationary-side raceway member (with an elastic seal bonded to a core metal) or may be formed of a seal member provided to the stationary-side raceway member and a slinger provided to the rotation-side raceway member, for example. The structure of the seal device is not limited to them as far as the device produces a sliding sound as the rotation-side raceway member rotates.

The AE (Acoustic Emission) sensor is well known and it is possible to detect a sound between members moving while in contact with each other in the rolling bearing, e.g., a sound of contact between the rolling elements and the stationary-side raceway member by using the AE sensor. However, this sound of contact changes by a small amount in response to the rotation. By utilizing the sliding sound between the seal device provided to the stationary-side raceway member and the rotation-side raceway member instead of the sound of contact, it is possible to detect the sound that changes by a large amount in response to the rotation. By obtaining a relationship between the sliding sound and the load (e.g., tire ground load) acting on the rolling bearing in advance and, also, converting a sliding sound obtained by the AE sensor into a load, the load acting on the rolling bearing can be obtained. At least one AE sensor is provided and the number of sensors is properly increased/decreased in accordance with the number of required components of the load.

According to a second aspect of the present invention, there is provided a sensor-equipped rolling bearing unit comprising: a rolling bearing which includes a stationary-side raceway member, a rotation-side raceway member, and rolling elements; and a sensor device which includes a sensor provided to the stationary-side raceway member, and processing means for obtaining a load acting on the rolling bearing from an output of the sensor, wherein the sensor includes a stator having four or more magnetic pole teeth and concentric with the stationary-side raceway member, and excitation coils and detection coils wound around the respective magnetic pole teeth, signals generated in the detection coils according to distances between the magnetic pole teeth and the rotation-side raceway member are taken out for the respective magnetic pole teeth, and the load acting on the rolling bearing is obtained in the processing means from these signals.

The sensor is the same as a known resolver in including the stator having four or more magnetic pole teeth and concentric with the stationary-side raceway member and the excitation coils and detection coils wound around the respective magnetic pole teeth and in utilizing electromagnetic induction by excitation. The sensor is different in that the signals generated in the detection coils are taken out for the respective magnetic pole teeth (a plurality of outputs by all-around multipolar electromagnetic coupling) and that, in this way, the respective detection coils function as displacement sensors, from the resolver in which the signals generated in the detection coils are averaged and in which the only one average signal is taken out. In the case of the resolver, the signals are averaged and deadened. Therefore, the resolver cannot be said to provide sufficient outputs to obtain load information. On the other hand, with this sensor, by taking out the signals from the respective detection coils, pieces of displacement information at respective portions can be obtained. By converting these signals into the load information, it is possible to obtain the load (e.g., three-direction component forces of the tire contact load) acting on the rolling bearing by utilizing the resolver structure and from the pieces of displacement information at the respective portions which cannot be obtained by the resolver performance.

The number of magnetic pole teeth is 8 or 10, for example, and the magnetic pole teeth are provided at regular intervals in a circumferential direction. However, the number is not especially limited as far as it is four or more, and the magnetic pole teeth are not necessarily provided at regular intervals.

The processing means preferably includes a three-direction component force computing part for storing a ground load arithmetic expression representing a relationship among a vertical component, a forward-backward component, and a lateral component of the load acting on the rolling bearing and outputs from the respective detection coils, and for obtaining the vertical component, the forward-backward component, and the lateral component of the load acting on the rolling bearing from the outputs of the respective detection coils by using the ground load arithmetic expression. The ground load arithmetic expression is obtained in advance by conducting a bench test and the like.

When the rolling bearing unit is a hub unit for a wheel, the sensor may be provided at a substantially central portion of the hub unit or may be provided at an axial inner end portion of the hub unit. In the former case, the stator is press-fitted into an inner periphery of the stationary-side raceway member and fixed to face an outer periphery of the rotation-side raceway member. In the latter case, the stator is supported on a support member press-fitted into an end portion of the stationary-side raceway member to face a rotor mounted to the rotary-side raceway member.

With the sensor-equipped rolling bearing unit according to the second aspect of the present invention, by individually using the outputs of all the detection coils, displacements at the respective portions in the circumferential direction can be detected. Not only the three-direction component forces but also torsion and moment can be detected. The processing means may include a moment computing part for storing a moment arithmetic expression representing a relationship among moment about a vertical axis and/or a front-rear axis acting on the rolling bearing and outputs of the respective detection coils and for obtaining the moment acting on the rolling bearing from the outputs from the respective detection coils by using the moment arithmetic expression. The processing means may further include a rotation information computing part for obtaining rotation information by averaging the outputs of all the detection coils and taking out the only one average signal.

With the sensor-equipped rolling bearing unit according to the first and second aspects of the present invention, it is possible to detect the tire ground load by using the sensor having a good balance of accuracy and cost.

With the sensor-equipped rolling bearing unit according to the first aspect of the present invention, the sliding sound from the seal device which changes by a large amount in response to the rotation can be detected by the AE sensor and the obtained sliding sound is converted into the load to thereby obtain the load acting on the bearing with high accuracy.

With the sensor-equipped rolling bearing unit according to the second aspect of the present invention, by only mounting the stator wound with the coils to the stationary-side raceway member, all of the four or more magnetic pole teeth of the stator function as displacement sensors to thereby obtain the load acting on the rolling bearing with high accuracy from these signals. Moreover, as compared with a case in which a plurality of displacement sensors are mounted, the displacement sensors according to the present invention can be handled as one sensor and can be mounted easily; thus, cost reduction is also possible.

DETAILED DESCRIPTION OF THE PREFERRED EMBODIMENTS

Figure 1:
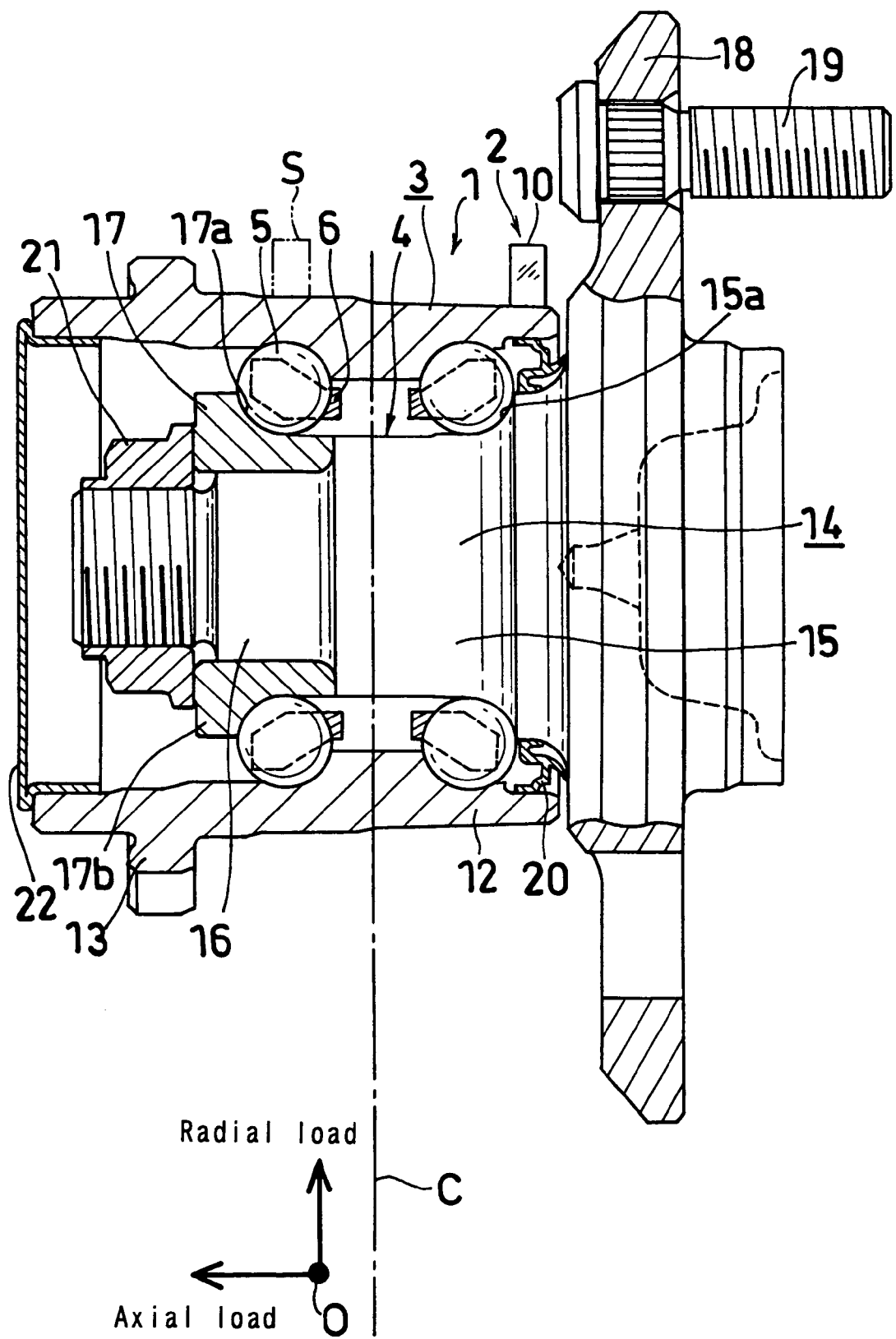
FIG. 1 is a vertical sectional view of an embodiment of a sensor-equipped rolling bearing unit according to a first aspect of the present invention.

FIG. 1 shows an embodiment of a sensor-equipped rolling bearing unit according to a first aspect of the present invention. In the following description, terms, "left" and "right" refer to "left" and "right" of FIG. 1. The left is on an inner side of a vehicle and the right is on an outer side of the vehicle.

The sensor-equipped rolling bearing unit is used as a sensor-equipped hub unit, and includes a hub unit (rolling bearing unit for a wheel) 1 and a sensor device 2 for detecting a ground load of a tire.

The hub unit 1 includes a stationary-side raceway member 3 fixed to a vehicle body, a rotation-side raceway member 4 to which a wheel is to be attached, balls 5 serving as a plurality of rolling elements arranged in two rows between both the members 3 and 4, and retainers 6 for holding the balls 5 in the respective rows.

The stationary-side raceway member 3 has a function as an outer ring (stationary ring) of the bearing, and includes a cylindrical part 12 formed at its inner peripheral face with two rows of outer ring raceways and a flange part 13 provided in a vicinity of a left end portion of the cylindrical part 12 and attached to a suspension system (vehicle body) through bolts.

The rotation-side raceway member 4 is formed of an inner shaft 14 and an inner ring 17. The inner shaft 14 includes a large-diameter part 15 having a first raceway groove 15a and a small-diameter part 16 having an outside diameter smaller than a diameter of the first raceway groove 15a. The inner ring 17 is fitted over an outer periphery of the small-diameter part 16 of the inner shaft 14 and has a right face in close contact with a left face of the large-diameter part 15 of the inner shaft 14. In a vicinity of a right end of the inner shaft 14, a flange part 18 to which a plurality of bolts 19 for mounting the wheel are fixed is formed. At a right portion of the inner ring 17, a raceway groove 17a is formed to be arranged side by side with the raceway groove 15a of the inner shaft 14 and a shoulder part 17b is formed at a left portion of the inner ring 17. Between a right end portion of the stationary-side raceway member 3 and the inner shaft 14, a seal device 20 is provided. At a left end portion of the small-diameter part 16 of the inner shaft 14, an external thread part is formed. Through a nut 21 screwed over the external thread part, the inner ring 17 is fixed to the inner shaft 14. A left end portion of the stationary-side raceway member 3 is covered with a cover 22.

Figure 2:
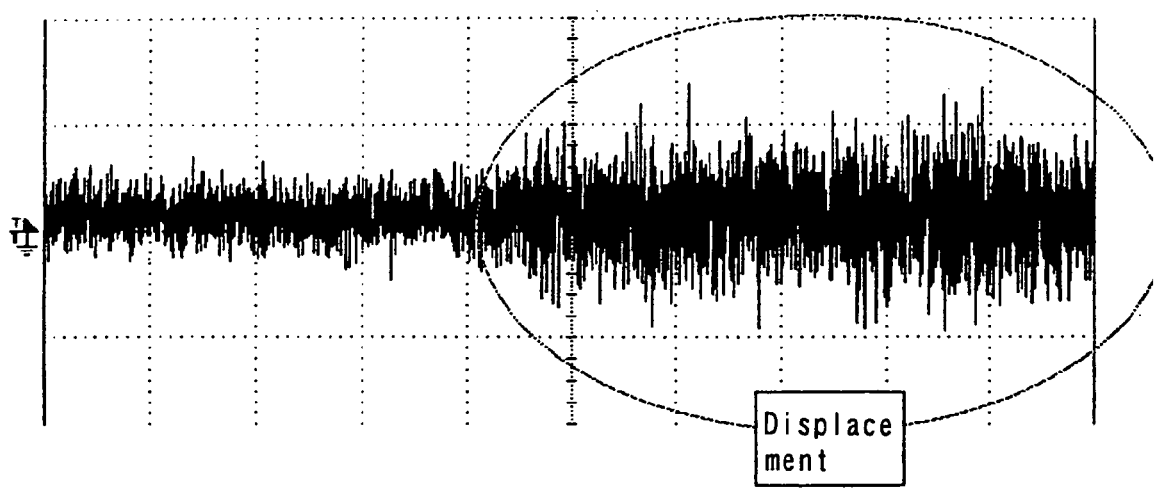
FIG. 2A is a graph showing a sound level detected by an AE sensor, which shows a case in which the sensor is provided in a position according to the present invention.
FIG. 2B is a graph showing a sound level detected by the AE sensor, which shows a case in which the sensor is provided in a vicinity of balls for comparison with the case in FIG. 2A.
Figure 2:
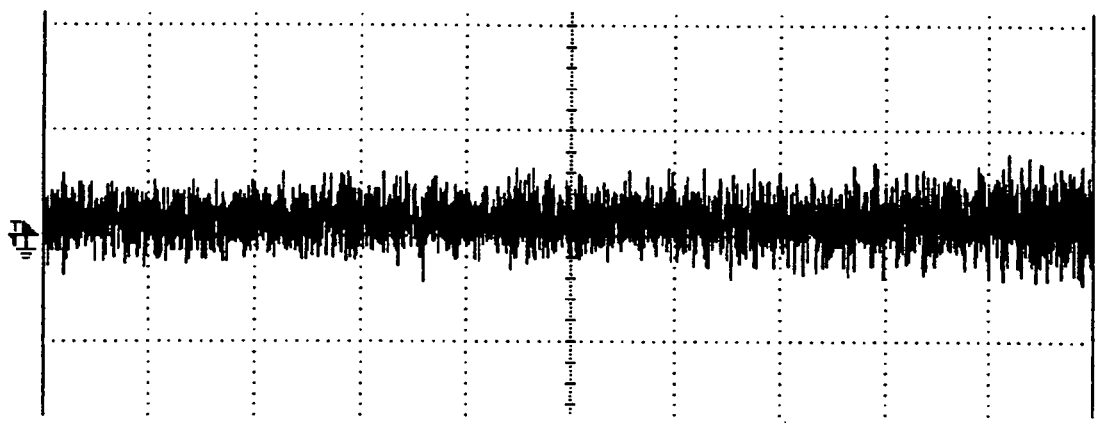

The sensor device 2 includes an AE sensor 10 provided to an outer periphery of the stationary-side raceway member 3, and processing means (not shown) for processing an output of the sensor 10. The AE sensor 10 is disposed in a vicinity of the seal device 20. When the ground load (a radial load and an axial load) acts on the tire, a displacement amount of the rotation-side raceway member 4 with respect to the stationary-side raceway member 3 changes and, as a result, a sliding sound of the seal device 20 in contact with the rotation-side raceway member 4 changes. FIGS. 2A and 2B show graphs of changes in the sensor output before and after rotation when the AE sensor 10 is disposed in the vicinity of the seal device 20 (in a position shown in a solid line in FIG. 1) and when an AE sensor S is disposed in a position shown in a two-dot chain line in FIG. 1 (in a vicinity of the balls 5 in an inner row). FIG. 2A shows the case in which the AE sensor 10 is disposed in the vicinity of the seal device 20, and FIG. 2B shows the case in which the AE sensor 10 is disposed in the vicinity of the balls 5. From these graphs, it can be understood that a change of the sound before and after the rotation is small when the AE sensor S is disposed in the vicinity of the balls 5 while the sound changes by a large amount before and after the rotation by disposing the AE sensor 10 in the vicinity of the seal device 20 and that the sliding sound of the seal device 20 can be detected by this disposition of the sensor 10. Therefore, by obtaining a relationship between the sliding sound detected by the AE sensor 10 and the tire ground load in advance, it is possible to obtain the tire ground load from the sliding sound obtained by the AE sensor 10 by using this relational expression. The obtained ground load is output to vehicle control means to properly control the vehicle.

Although the sensor-equipped hub unit has been described above, the sensor device may be used while being integrated with any kind of rolling bearing other than the hub unit.

Figure 3:
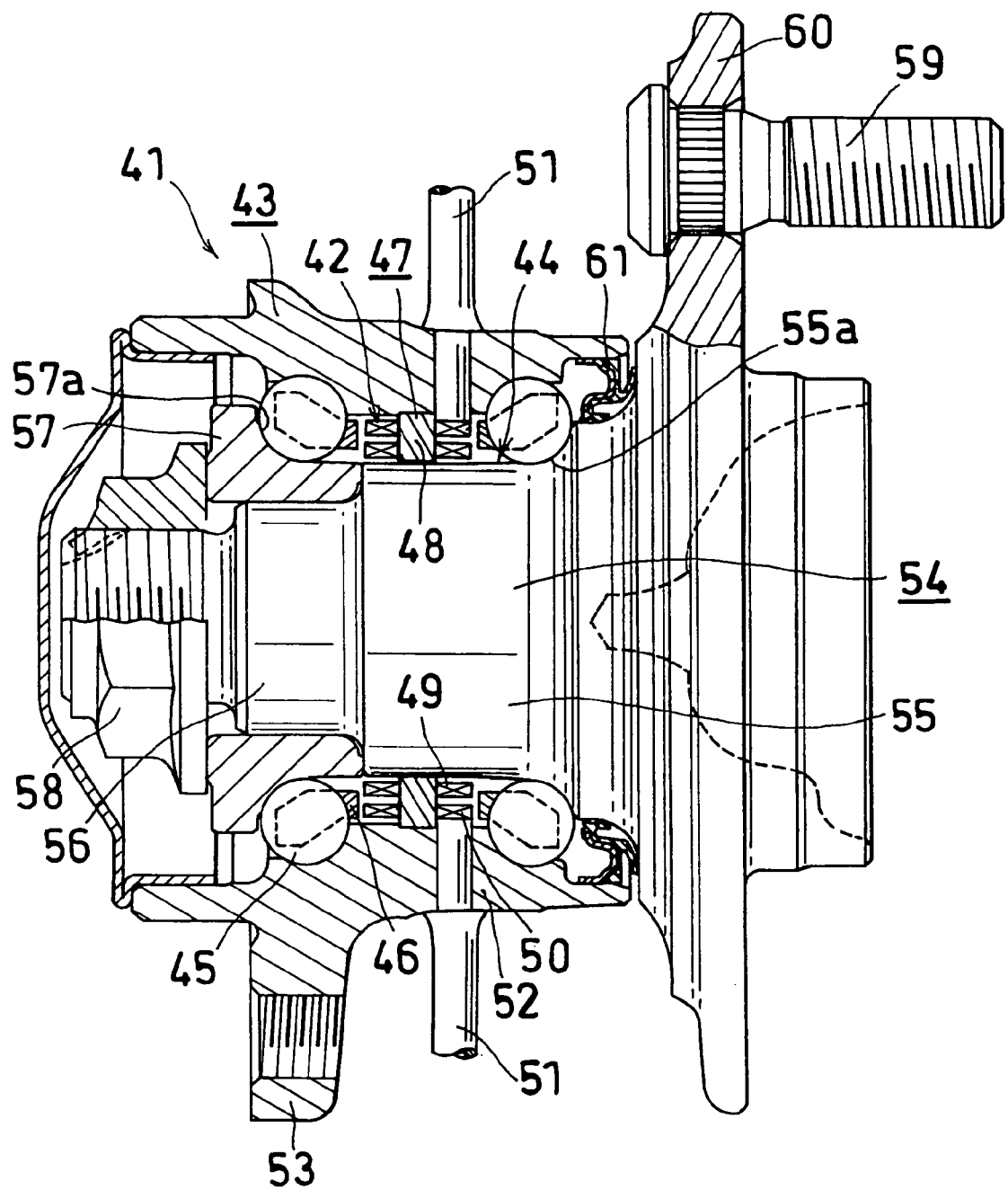
FIG. 3 is a vertical sectional view of a first embodiment of a sensor-equipped rolling bearing unit according to a second aspect of the present invention.
Figure 4:
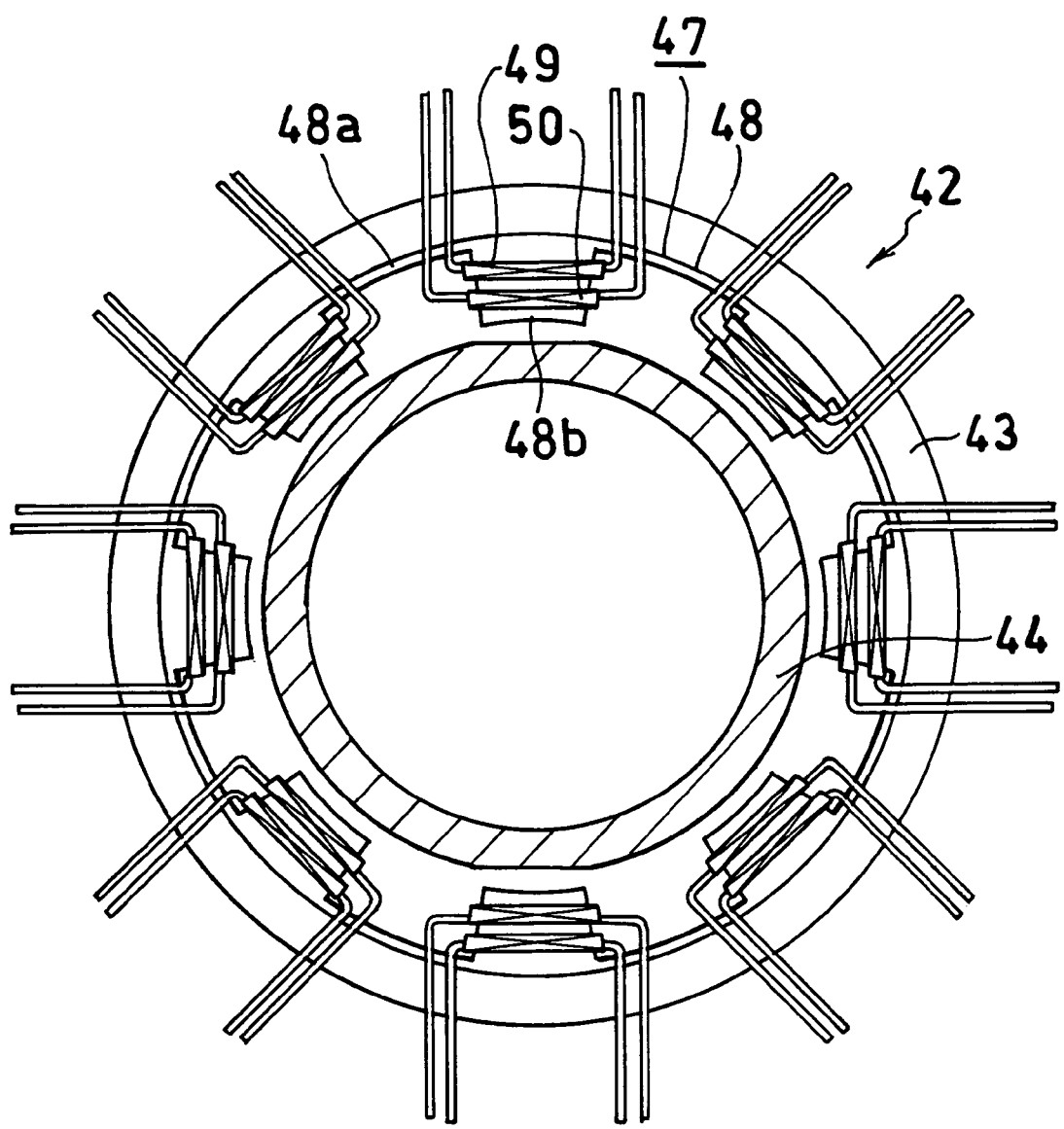
FIG. 4 is a cross sectional view of a main part of FIG. 3.

FIGS. 3 and 4 show a first embodiment of a sensor-equipped rolling bearing according to a second aspect of the present invention. In the following description, terms, "left" and "right" refer to "left" and "right" of FIG. 3. The left is on an inner side of a vehicle and the right is on an outer side of the vehicle.

The sensor-equipped rolling bearing unit is used as a sensor-equipped hub unit, and includes a hub unit (rolling bearing unit for a wheel) 41 and a sensor device 42 for detecting a ground load of a tire.

The hub unit 41 includes a stationary-side raceway member 43 fixed to a vehicle body, a rotation-side raceway member 44 to which a wheel is to be attached, balls 45 serving as a plurality of rolling elements arranged in two rows between both the members 43 and 44, and retainers 46 for holding the balls 45 in the respective rows.

The stationary-side raceway member 43 includes a cylindrical part 52 formed at its inner peripheral face with two rows of outer ring raceways, and a flange part 53 provided in a vicinity of a left end portion of the cylindrical part 52 and attached to a suspension system (vehicle body) through bolts. The rotation-side raceway member 44 is formed of a shaft part 54 and a ring part 57. The shaft part 54 includes a large-diameter part 55 having a first raceway groove 55a and a small-diameter part 56 having an outside diameter smaller than a diameter of the first raceway groove 55a. The ring part 57 is fitted over an outer periphery of the small-diameter part 56 of the shaft part 54. At a left end portion of the shaft part 54, an external thread part is formed. A nut 58 for bringing the ring part 57 into close contact with a left end face of the large-diameter part 55 of the shaft part 54 is screwed over the external thread part. In a vicinity of a right end of the shaft part 54, a flange part 60 to which a plurality of bolts 59 for mounting the wheel are fixed is formed. At the ring part 57, a raceway groove 57a is formed to be arranged side by side with the raceway groove 55a of the shaft part 55. Between a right end portion of the stationary-side raceway member 43 and the shaft part 55, a seal device 61 is provided.

The sensor device 42 includes a sensor 47 provided to the fixed-side raceway member 43, and processing means (not shown) for obtaining a load acting on the hub unit 41 from an output of the sensor 47.

The sensor 47 includes a stator 48 formed of an annular part 48a concentric with the stationary-side raceway member 43 and four or more (ten in the figure) magnetic pole teeth 48b provided to an inner peripheral face of the annular part 48a at regular intervals in a circumferential direction, excitation coils 49 and detection coils 50 wound around the respective magnetic pole teeth 48b, a power source (not shown) for passing an electric current through the respective excitation coils 49, and signal lines 51 for taking signals of the respective detection coils 50 outside. The excitation coils 49 and the detection coils 50 of the magnetic pole teeth 48b adjacent to each other are not connected through crossovers but output lines and input lines are provided for each magnetic pole teeth 48b. The stator 48 is press-fitted into a substantially central portion in an axial direction of the stationary-side raceway member 43 and fixed-with tip ends of the magnetic pole teeth 48b facing an outer periphery of the rotation-side raceway member 44 at small distances from the outer periphery. When electric currents are passed through the respective excitation coils 49, electromagnetic induction currents are generated in the detection coils 50 according to the distances between the magnetic pole teeth 48b and the rotation-side raceway member 44 and voltages of the currents are taken out of the detection coils 50 for the respective magnetic pole teeth 48b.

For example, if an external load acts on the rotation-side raceway member 44 facing and being concentric with the respective magnetic pole teeth 48b, an axial center of the rotation-side raceway member 44 becomes eccentric and, as a result, distances between inner peripheral faces of the respective magnetic pole teeth 48b and the outer peripheral face of the rotation-side raceway member 44 are different from each other. Therefore, if the respective magnetic pole teeth 48b are connected through crossovers, outputs of the detection coils 50 of the respective magnetic pole teeth 48b are averaged. On the other hand, if the excitation coil 49 and the detection coil 50 are provided to each magnetic pole tooth 48b and output signals are taken out, it is possible to detect the eccentricity with higher accuracy. Moreover, the four magnetic pole teeth 48b are provided at regular intervals to face the rotation-side raceway member 44 and outputs of the respective magnetic pole teeth 48*b* are detected to thereby perform computations on loads in a vertical direction and a lateral direction through the processing means (not shown).

The processing means includes a three-direction component force computing part for storing a ground load arithmetic expression representing a relationship among a vertical component, a forward-backward component, and a lateral component of the tire ground load acting on the hub unit 41 and the outputs of the respective detection coils 50, and for obtaining the vertical component, the forward-backward component, and the lateral component of the tire ground load acting on the hub unit 41 from the outputs of the respective detection coils 50 by using the ground load arithmetic expression.

Figure 5:
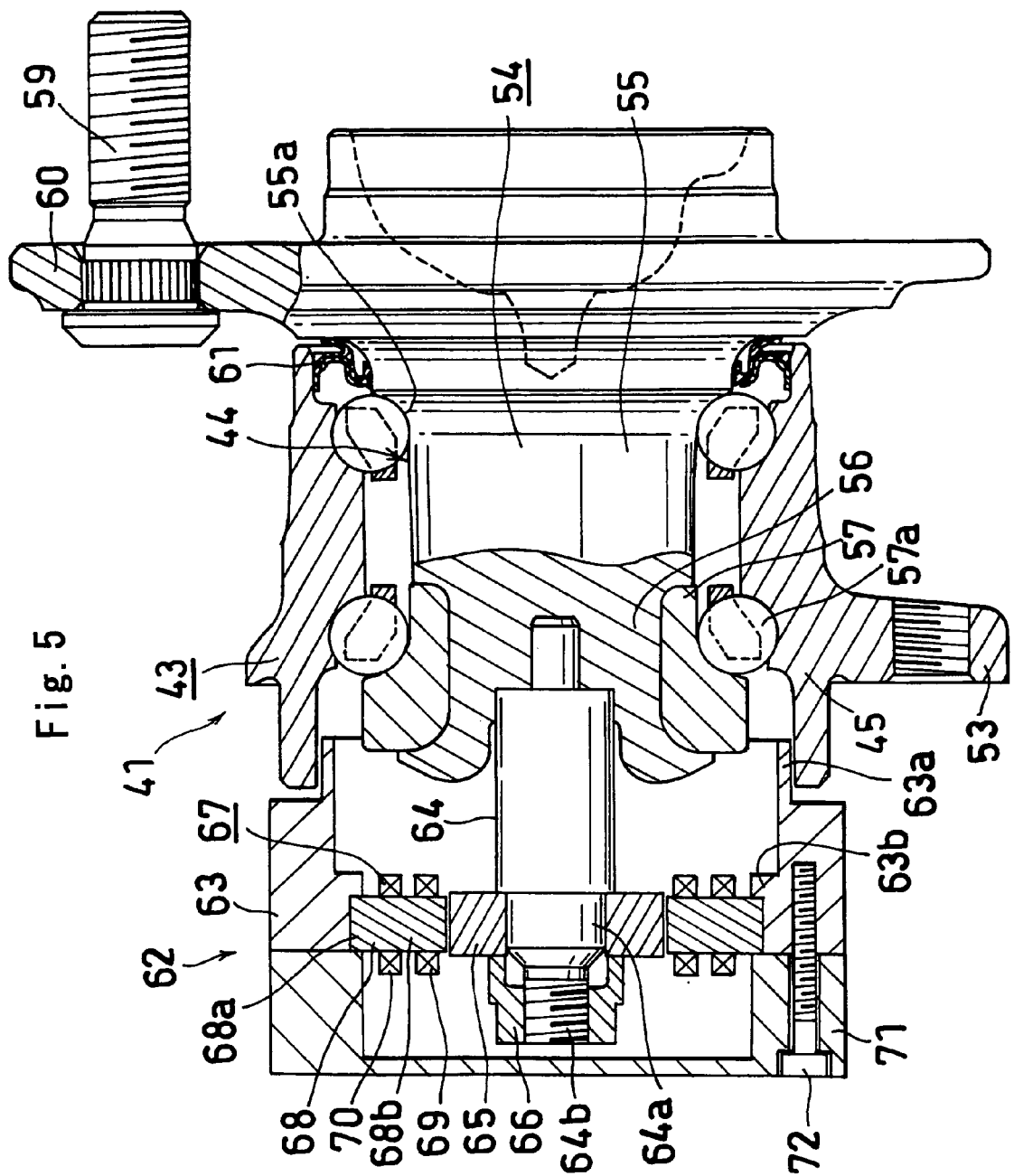
FIG. 5 is a vertical sectional view of a second embodiment of a sensor-equipped rolling bearing unit according to the second aspect of the present invention.

FIG. 5 shows a second embodiment of the sensor-equipped rolling bearing unit according to the second aspect of the present invention. In the following description, structures similar to those in the first embodiment are provided with similar reference numerals and description of such structures will be omitted.

This sensor-equipped rolling bearing unit is also used as a sensor-equipped hub unit, and includes a hub unit 41 and a sensor device 62 for detecting a ground load of a tire.

The ring part 57 of the hub unit 41 is fixed to the shaft part 54 by crimping an end portion of the small-diameter part 56 of the rotation-side raceway member 44 outward in a radial direction.

The sensor device 62 includes a sensor 67 supported on a sensor support member 63 provided to the stationary-side raceway member 43, a rotor 65 supported on a rotor mounting shaft 64 provided to the rotation-side raceway member 44, and processing means (not shown) for obtaining a load acting on the hub unit 41 from an output of the sensor 67. The sensor device 62 is provided to a left end portion (axial inner end portion) of the hub unit 41.

The sensor 67 is the same as that in the first embodiment (see FIG. 4), and includes an annular part 68*a* concentric with the stationary-side raceway member 43, a stator 68 formed of four or more (ten in the figure) magnetic pole teeth 68*b* provided to an inner peripheral face of the annular part 68*a* at regular intervals in a circumferential direction, and excitation coils 69 and detection coils 70 wound around the respective magnetic pole teeth 68*b*. To the excitation coil 69 and the detection coil 70 of each magnetic pole tooth 68*b*, output lines and input lines are provided, respectively.

The sensor support member 63 is in a cylindrical shape. A right protruding part 63*a* press-fitted into an inner periphery of a left end portion of the stationary-side raceway member 43 is formed at a right end portion of the sensor support member 63. At a substantially central portion of the sensor support member 63, a protruding part 63*b* protruding radially inward for positioning of the stator 68 is formed.

A right end portion of the rotor mounting shaft 64 is fixed to the small-diameter part 56 of the rotation-side raceway member 44. In a vicinity of a left end portion of the rotor mounting shaft 64, a rotor fitting part 64*a* having a smaller diameter than a portion on the right is formed. At the left end portion of the rotor mounting shaft 64, an external thread part 64*b* having a smaller diameter than the rotor fitting part 64*a* is formed. The rotor 65 is fitted over the rotor fitting part 64*a* of the rotor mounting shaft 64 and is fixed to the rotor mounting shaft 64 through a nut 66 screwed over the external thread part 64*b*.

The stator 68 is fitted in an inner periphery of the support member 63 with inner peripheries of the magnetic pole teeth 68*b* facing an outer periphery of the rotor 65 at small distances from the outer periphery. To the support member 63, a cover 71 for preventing withdrawal of the rotor 65 is fixed through a screw 72.

When electric currents are passed through the respective excitation coils 69, electromagnetic induction currents are generated in the detection coils 70 according to the distances between the magnetic pole teeth 68*b* and the rotor 65 and voltages of the currents are taken out of the detection coils 70 for the respective magnetic pole teeth 68*b*.

The processing means includes a three-direction component force computing part for storing a ground load arithmetic expression representing a relationship among a vertical component, a forward-backward component, and a lateral component of the tire ground load acting on the hub unit 41 and the outputs of the respective detection coils 70, and for obtaining the vertical component, the forward-backward component, and the lateral component of the tire ground load acting on the hub unit 41 from the outputs of the respective detection coils 70 by using the ground load arithmetic expression.

With the sensor-equipped rolling bearing unit according to the second aspect of the present invention, when the tire ground load changes, a displacement amount of the rotation-side raceway member 44 with respect to the stationary-side raceway member 43 changes and, as a result, the distances between the magnetic pole teeth 48*b*, 68*b* and the rotation-side raceway member 44 detected by the respective detection coils 50, 70 of the sensors 47, 67 change. The changes in the distances are output as voltage variations from the respective detection coils 50, 70 of the sensor 47, 67. In the three-direction component force computing part of the processing means of the sensor, based on the output signals, the vertical component, the forward-backward component, and the lateral component of the tire ground load are obtained. The obtained ground load is output to vehicle control means to properly control the vehicle.

The sensor device according to the second aspect of the present invention may also be used while being integrated with any kind of rolling bearing other than the hub unit.

As a sensor used for obtaining the load acting on the rolling bearing, a load sensor, a displacement sensor, a strain sensor, a six-component force meter, and a resolver can be considered. However, these sensors have problems, respectively. With the sensor-equipped rolling bearing according to the present invention, it is possible to avoid these problems: need of pre-load and difficulty in adjustment when the load sensor is used; need of a device in an object to be detected when the displacement sensor is used; a presence of temperature drift when the strain sensor is used; high cost when the six-component force meter is used; and poor load detecting accuracy when the resolver is used.

What is claimed is:

1. A sensor-equipped rolling bearing unit comprising:
   a rolling bearing which includes a stationary-side raceway member, a rotation-side raceway member, and rolling elements; and
   a sensor device which includes a sensor provided to the stationary-side raceway member and a processing device for obtaining a load acting on the rolling bearing from an output of the sensor, wherein
   the sensor is an AE sensor and disposed in a vicinity of a seal device provided between the stationary-side raceway member and a rotation-side raceway member, and
   the load acting on the rolling bearing is obtained in the processing device from a sliding sound of the seal device detected by the AE sensor, by obtaining a relationship between the sliding sound and the load acting on the rolling bearing in advance and converting the sliding sound detected by the AE sensor.

2. A sensor-equipped rolling bearing unit comprising:

a rolling bearing which includes a stationary-side raceway member, a rotation-side raceway member, and rolling elements; and a sensor device which includes a sensor provided to the stationary-side raceway member, and a processing device for obtaining a load acting on the rolling bearing from an output of the sensor, wherein the sensor includes a stator having four or more magnetic pole teeth and concentric with the stationary-side raceway member, and excitation coils and detection coils wound around the respective magnetic pole teeth, signals generated in the detection coils according to distances between the magnetic pole teeth and the rotation-side raceway member are taken out for the respective magnetic pole teeth, and the load acting on the rolling bearing is obtained in the processing device from said signals.

3. A sensor-equipped rolling bearing unit according to claim 1, wherein the AE sensor is provided on an outer peripheral face of the stationary-side raceway member and on a cylindrical face defined by axially opposite ends of the seal device.

4. A sensor equipped rolling bearing unit according to claim 2 wherein the processing device includes a three-direction component force computing part for storing a ground load arithmetic expression representing a relationship among a vertical component, a forward-backward component, and a lateral component of the load acting on the rolling bearing and outputs from the respective detection coils, and for obtaining the vertical component, the forward-backward component, and the lateral component of the load acting on the rolling bearing from the outputs of the respective detection coils by using a ground load arithmetic expression.

* * * * *